(12) United States Patent
Bitetto et al.

(10) Patent No.: US 11,842,625 B2
(45) Date of Patent: Dec. 12, 2023

(54) SOCIAL DISTANCING DEVICES AND METHODS

(71) Applicants: James J. Bitetto, Dix Hills, NY (US); John G. Tutunjian, Huntington, NY (US)

(72) Inventors: James J. Bitetto, Dix Hills, NY (US); John G. Tutunjian, Huntington, NY (US)

( * ) Notice: Subject to any disclaimer, the term of this patent is extended or adjusted under 35 U.S.C. 154(b) by 45 days.

(21) Appl. No.: 17/454,867

(22) Filed: Nov. 15, 2021

(65) Prior Publication Data
US 2022/0076546 A1 Mar. 10, 2022

Related U.S. Application Data

(63) Continuation of application No. 16/844,502, filed on Apr. 9, 2020, now Pat. No. 11,205,328.

(51) Int. Cl.
*G08B 5/36* (2006.01)
*G08B 3/10* (2006.01)
(Continued)

(52) U.S. Cl.
CPC ............... *G08B 5/36* (2013.01); *F21S 9/02* (2013.01); *F21V 14/02* (2013.01); *F21V 21/08* (2013.01); *F21V 21/30* (2013.01); *F21V 23/0464* (2013.01); *F21V 23/0471* (2013.01); *G06V 40/103* (2022.01); *G08B 3/10* (2013.01); *A42B 1/244* (2013.01); *A42B 3/044* (2013.01); *A42B 3/0433* (2013.01); *A42B 3/0446* (2013.01); *B25J 9/1666* (2013.01); *B25J 9/1676* (2013.01); *F21V 33/0008* (2013.01); *F21W 2131/30* (2013.01);
(Continued)

(58) Field of Classification Search
CPC . F16P 3/144; F16P 3/147; F21V 21/14; F21V 21/145; F21V 21/26; F21V 21/28; F21V 21/29; F21V 21/30; F21V 21/32; F21V 33/0008; G08B 5/36
See application file for complete search history.

(56) References Cited

U.S. PATENT DOCUMENTS 6,736,529 B1 * 5/2004 Lee ..................... F21V 21/084
362/269
7,232,236 B2 6/2007 Vitense ................... G09F 19/18
116/209

(Continued)

OTHER PUBLICATIONS

"LPU Researchers Develop 'KAWACH', IoT Device For Safe Social Distancing," Mar. 25, 2020, BW Education, http://bweducation.businessworld.in/article/LPU-Researchers-Develop-KAWACH-IoT-Device-For-Safe-Social-Distancing/25-03-2020-187238/ (Year: 2020).

(Continued)

*Primary Examiner* — Colin J Cattanach
(74) *Attorney, Agent, or Firm* — Tutunjian & Bitetto, P.C.

(57) ABSTRACT

A device for indicating appropriate social distancing includes the ability to project light (in various forms and in a various ways) onto the ground in a manner visible by the user and those around them. A boundary of the projected light can be set to an acceptable social distance and can include different colors to indicated varying social distances for varying levels of trusted individuals. Proximity sensors set to appropriate distancing requirements, along with the varying levels of trust can be implemented into multiple devices being used in a group setting.

31 Claims, 16 Drawing Sheets

(51) Int. Cl.

| | |
|---|---|
| *F21V 21/08* | (2006.01) |
| *F21V 21/30* | (2006.01) |
| *F21V 23/04* | (2006.01) |
| *F21V 14/02* | (2006.01) |
| *F21S 9/02* | (2006.01) |
| *G06V 40/10* | (2022.01) |
| *F21Y 115/10* | (2016.01) |
| *G08B 5/38* | (2006.01) |
| *F21W 131/30* | (2006.01) |
| *A42B 1/244* | (2021.01) |
| *A42B 3/04* | (2006.01) |
| *F21V 33/00* | (2006.01) |
| *B25J 9/16* | (2006.01) |
| *G08B 21/02* | (2006.01) |
| *G02B 7/00* | (2021.01) |
| *G01B 11/14* | (2006.01) |

(52) U.S. Cl.
CPC ........... *F21Y 2115/10* (2016.08); *G01B 11/14* (2013.01); *G02B 7/002* (2013.01); *G05B 2219/31286* (2013.01); *G05B 2219/39091* (2013.01); *G05B 2219/40219* (2013.01); *G05B 2219/40455* (2013.01); *G05B 2219/40475* (2013.01); *G05B 2219/40544* (2013.01); *G06V 40/10* (2022.01); *G06V 40/107* (2022.01); *G08B 5/38* (2013.01); *G08B 21/0202* (2013.01)

(56) References Cited

U.S. PATENT DOCUMENTS

| | | | |
|---|---|---|---|
| 9,656,602 B2 | 5/2017 | Needham | B62J 6/04 |
| 9,695,982 B2 | 7/2017 | Rivet | F16P 3/147 |
| 10,089,809 B1* | 10/2018 | Daly | G07C 9/00174 |
| 10,636,308 B2 | 4/2020 | Glatfelter | G08G 1/164 |
| 10,803,714 B1 | 10/2020 | Khera | F21V 21/0885 |
| 2002/0159249 A1 | 10/2002 | Mickey | A42B 1/244 |
| | | | 362/106 |
| 2004/0041983 A1 | 3/2004 | Bleiner | B60Q 1/52 |
| | | | 353/13 |
| 2004/0246129 A1 | 12/2004 | Goggin | G08B 21/24 |
| | | | 340/539.23 |
| 2010/0283590 A1 | 11/2010 | Tee | B62J 6/04 |
| | | | 340/432 |
| 2011/0273293 A1 | 11/2011 | Itkin | G08B 13/184 |
| | | | 340/557 |
| 2011/0273870 A1* | 11/2011 | Yu | A45F 3/14 |
| | | | 29/525.01 |
| 2012/0025964 A1 | 2/2012 | Beggs | B60Q 1/26 |
| | | | 340/435 |
| 2014/0055252 A1 | 2/2014 | Ascencio | B60Q 1/50 |
| | | | 340/425.5 |
| 2015/0154850 A1 | 6/2015 | Fadell | G08B 29/185 |
| | | | 340/501 |
| 2017/0114963 A1 | 4/2017 | Villalobos | F21V 33/0008 |
| 2017/0369288 A1 | 12/2017 | Fulton | B25J 9/1676 |
| 2018/0100646 A1 | 4/2018 | Sullivan | F21S 9/02 |
| 2018/0295904 A1 | 10/2018 | Looper | A43B 7/12 |
| 2019/0072268 A1* | 3/2019 | Tomita | A41F 9/002 |
| 2019/0223275 A1* | 7/2019 | Chen | H05B 47/19 |
| 2020/0043271 A1 | 2/2020 | Anderson | H04N 5/2257 |

OTHER PUBLICATIONS

"Social Distance Thing," YouTube.com, Mar. 28, 2020, https://www.youtube.com/watch?v=wCCmFIYIWo4. (Year: 2020).

Carla Lauter, "A simple DIY laser project to encourage social distancing," Mar. 31, 2020, SPAR3D, https://www.spar3d.com/news/related-new-technologies/a-simple-diy-laser-project-to-encourage-social-distancing/ (Year: 2020).

"'KAWACH'—A device that helps you keep Social Distancing," Mar. 26, 2020, YouTube.com, https://www.youtube.com/watch?v=ELe7eblmhYM (Year: 2020).

"Coronavirus: Engineering student develops pendant to ensure social distancing," The Economic Times|Tech, Mar. 25, 2020, https://economictimes.indiatimes.com/tech/hardware/coronavirus-engineering-student-develops-pendant-to-ensure-social-distancing/articleshow/74807065.cms (Year: 2020).

List of Patents or Patent Applications Treated as Related dated Nov. 15, 2021, 2 pgs.

* cited by examiner

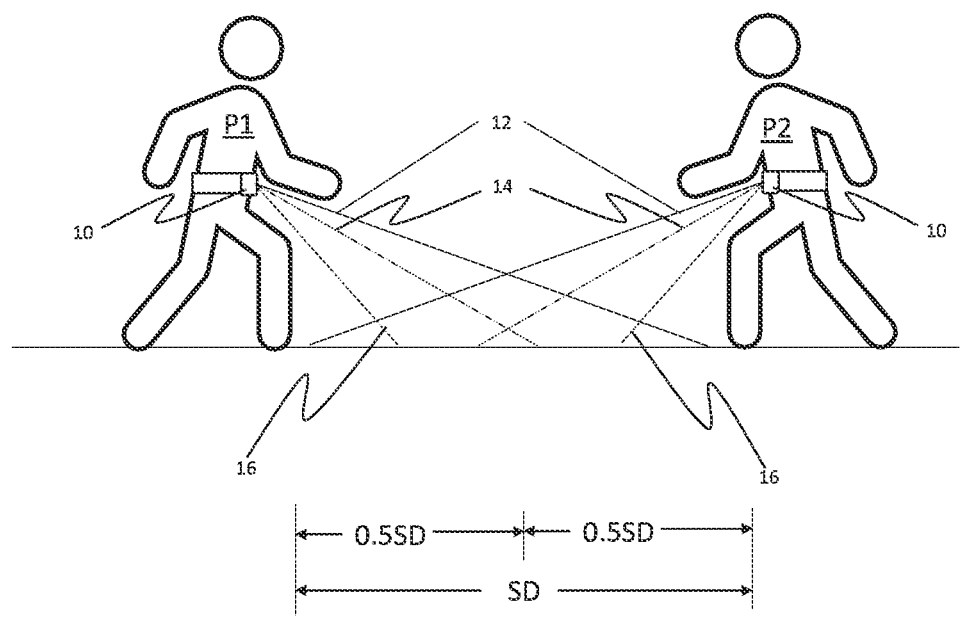

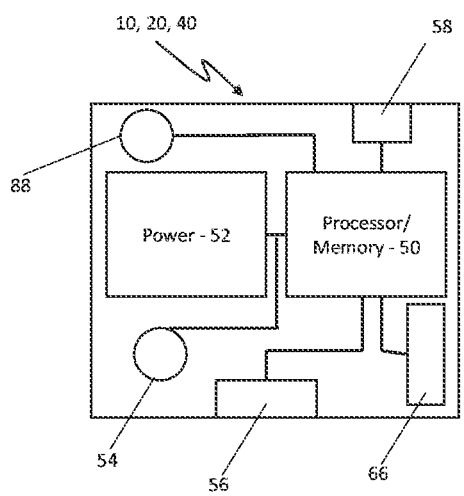

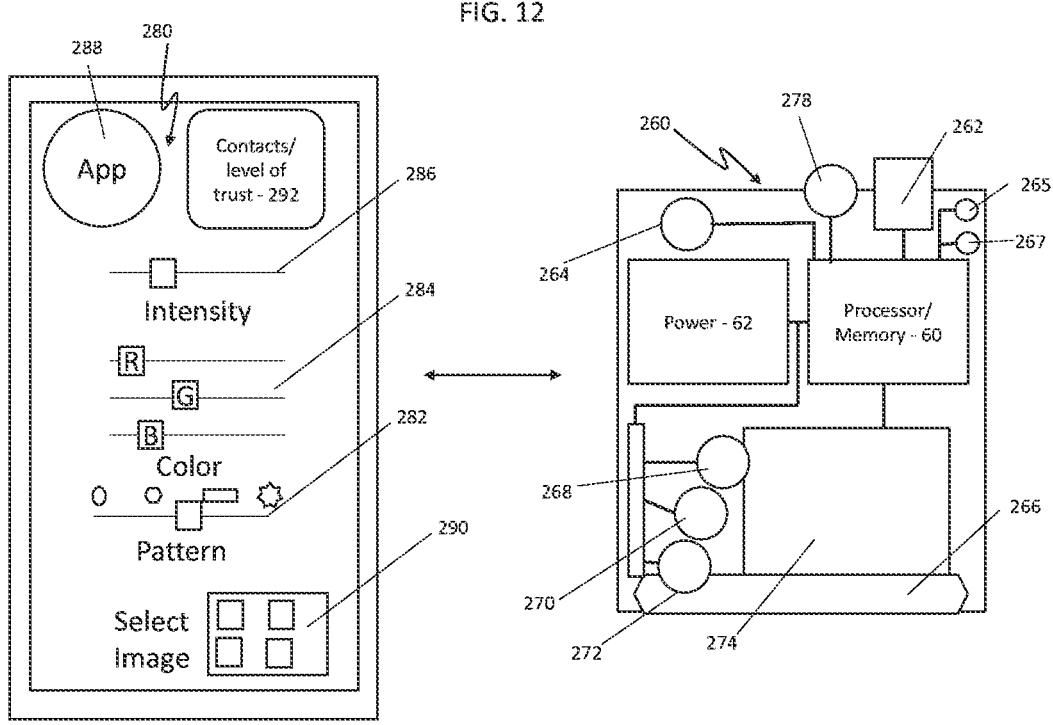

SOCIAL DISTANCING DEVICES AND METHODS

BACKGROUND

Technical Field

The present principles relate to social distancing. More particularly, they relate to devices and methods for assuring and maintaining appropriate social distance from others depending on the particular environment.

Related Art

The current times of disease outbreaks and pandemics require that people maintain a social distance from other individuals. It is often difficult to evaluate a minimum distance based on human perception.

SUMMARY OF THE INVENTION

Devices and methods are provided that provide visual and/or audible indications of appropriate social distances based on various factors.

In one embodiment, a social distance device includes a wearable base configured to be positioned on a person. A light source is pivotally connected to the base to permit angular adjustment of the light source relative to the base. A locking mechanism is configured to maintain the light source in a position to direct light a set distance from the person when worn to indicate a safe distance boundary.

In another embodiment, a social distance device includes a wearable base configured to be positioned on a person. A proximity sensor connected to the base and configured to sense the presence of an object or person that is a predetermined safe social distance from the wearable base. An indicator light configured to respond to the proximity sensor and illuminate when the presence of an object or person is sensed to be within the predetermined distance.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIG. 2C shows a schematic diagram of two people wearing an SD device in accordance with an implementation of the present principles;

FIG. 5 is a schematic block diagram of the SD device, according to an implementation of the present principles;

FIG. 12 is a schematic block diagram of the implementation of an SD device using an application to program the same, according to an implementation of the present principles.

DETAILED DESCRIPTION

Maintaining an interaction distance has many useful applications. In particularly useful embodiments, social distancing can be employed to prevent the spread of disease or to provide a reminder to others where personal space begins. There are many instances in which it will be desirable to maintain this "social distance" at all times. Examples of such instances would be walking down the street, while shopping in retail establishments, and even eating at restaurants. The need to maintain the social distance can be even more challenging in business settings, particularly, as it relates to business meetings, seminars, and/or gatherings of any kind where strangers are likely to be encountering or meeting other strangers. Other more social examples of gatherings where maintaining appropriate social distance can be challenging could include dating, single organizations, children's dances or the like.

General guidelines for social distancing or physical distancing can include different distances depending on the need or application. A 6-foot radius from a person is considered a "safe" social distance in situations where respiratory droplets can be exchanged as a mechanism for disease spread. In other situations, the social distance could be three feet, which could also be considered personal space. Other embodiments can include maintaining a distance in accordance with a protective order or other situations. Social distancing criteria can be set by governmental agencies, such as, the Center for Disease Control (CDC) for prevention of the spreading of viruses and the like. However, in addition to the newly set standard of a 6 foot radius, it is further contemplated herein that this radius can be altered depending on, for example, the type of threat or gathering, the familiarity of the individuals encountering each other, and/or based on a plurality of variables that the user may be able to select from.

Embodiments of the present invention relate to warning and indicating an appropriate social distance (SD). As will be appreciated, in one embodiment, a light generating feature can be worn or otherwise attached to a person to illuminate an area indicating a boundary for an appropriate SD. Several factors can play into the ability to project the appropriate SD. For example, if the SD device is worn on the front of the person's torso, the ability to project light entirely around the person will be limited by their body blocking a portion of the projection. The ability to project light at the appropriate predefined social distance will be depend on the physical distance of the SD device from the ground or referred to herein as a positional height (PH) of the SD device. It should be understood that the SD can be modified by resetting the illumination feature.

Figure 1:
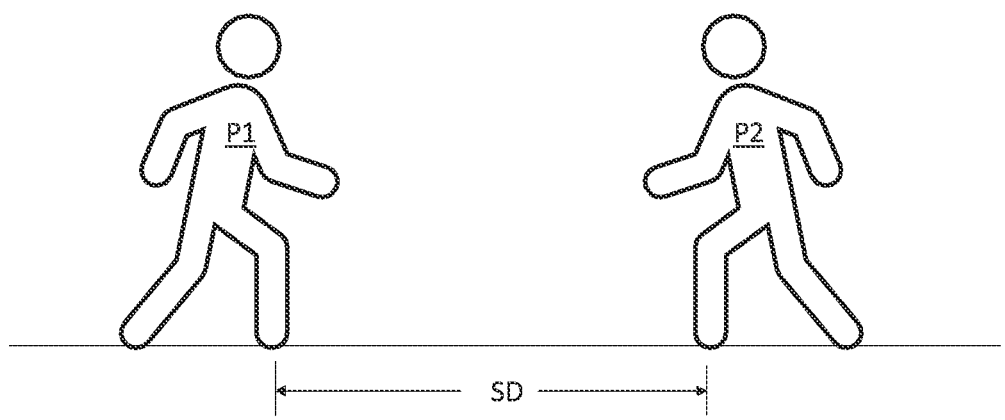
FIG. 1 is a schematic diagram showing the concepts behind social distancing.

FIG. 1 demonstrates a guideline for social distance SD between person P1 and person P2. As discussed above, the general guideline for SD can be 6 feet.

Figure 2A:
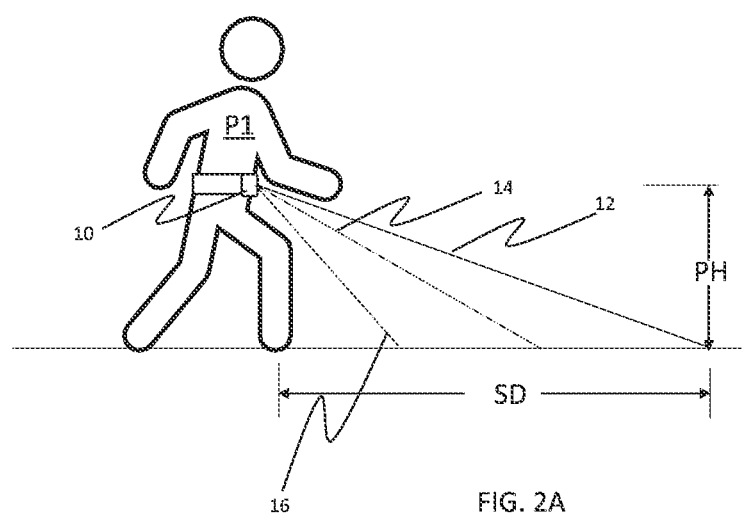
FIG. 2A shows a plan view of a person wearing an SD device according to one implementation of the present principles.
Figure 2B:
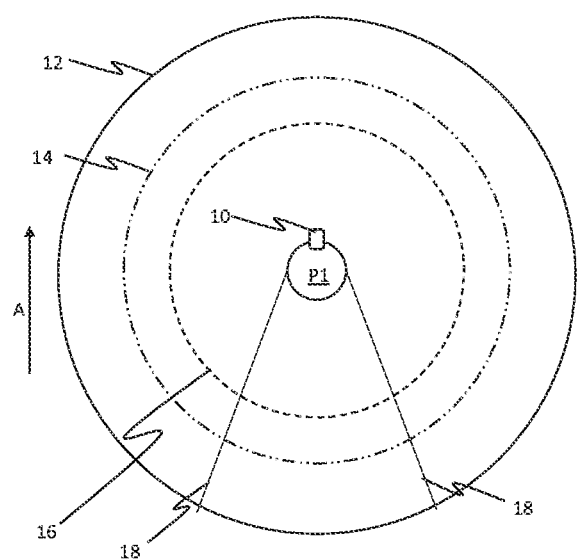
FIG. 2B shows an overhead view of person P1 in FIG. 1 with various perimeter settings of the SD device, according to another implementation of the present principles.

Referring to FIGS. 2A and 2B, there is shown person P1 wearing a social distance (SD) device 10. The SD device 10 can be worn, for example, on the person's clothing, on their waist (e.g., belt) or attached to a hat or shoe, and is configured to emit or project light (12, 14, 16) onto the ground such that a perimeter or a predetermined boundary from the wearer is delineated by the same. As shown, by way of example, SD device 10 can project the standard six-foot perimeter 12 or could be configured to project light at different perimeters 14, 16 (described in more detail below).

A positional height PH of the SD device 10 will have an impact on the light perimeter projected. According to one implementation, the SD device 10 can have programmable or fixed settings that identify the positional height of the same (e.g., 3 ft, 3.5 ft, 4 ft, 4.5 ft, 5 ft, etc.). The SD device can be adjustable in accordance with each person to accommodate for height differences from person to person. In addition, the adjustment can permit each wearer the freedom to allow them to determine the appropriate positional height or location of attachment based on where they are wearing the SD device 10 (e.g., waist, head, neck, arms, etc.). In other embodiments, the PH can be user programmable using a smartphone app in communication with the SD device.

A projection of light 12, 14, 16, 18 from the SD device 10 onto the ground is represented using dots, lines, partial arcs and/or semi-circles projected in front of the person as they move in a direction indicated by the arrow "A" (FIG. 2B). Alternatively, SD device 10 can project a full circle around person P1; however, as noted above, it will be appreciated that the torso of P1 can block some of such projected light behind them (represented by lines 18 in FIG. 2B). It should be understood that a pattern of light projected (e.g., 12, 14, 16, 18) on the ground or other surface can take on a plurality of different forms. For example, the boundary of the projection can be a series of spots, shapes, textures or the like. There can also be included a number of different colors. Colors can represent different regions or different levels of separation.

In accordance with contemplated implementations, SD device 10 can include a laser, light emitting diode (LED) or a plurality of each, or combinations of each. In other embodiments, the light can include an incandescent bulb or other lighting source. The light source(s) can include any useful combination of sources. In one embodiment, the projected light could be provided using laser light with an appropriate beam shifter to shape the light into a desired shape or shapes. In another embodiment, the projected light could be generated by a bright LED (of any color) shining through a focusing device or lens device that can create the light projection on the ground in any desired shape or shapes.

FIG. 2C shows an example of when P1 and P2 encounter each other with their SD devices 10. As shown, each can project a light 12 at the standard 6-foot distance. Thus, P1 and P2 can visually observe when their light 12 is at the feet of the other person. If desired, the light beam 14 can be used where a 3 foot (½ SD) is projected and P1 and P2 would now know they are appropriately separated when the two beams 14 from the respective devices meet each other between them. It should be further understood that the SD device 10 can be employed by a single user while they are alone without the need for the other person (e.g., P2) employing another SD device 10.

It is further contemplated that there will be instances when people are willing to allow others to breach the 6-foot SD, and in this instance the SD device 10 can be configured to emit light at a smaller radius 16 around the person. Such embodiments could be useful in a dating environment, or gatherings of singles who express an interest in each other and are willing to take the chances with certain individuals.

Figure 3A:
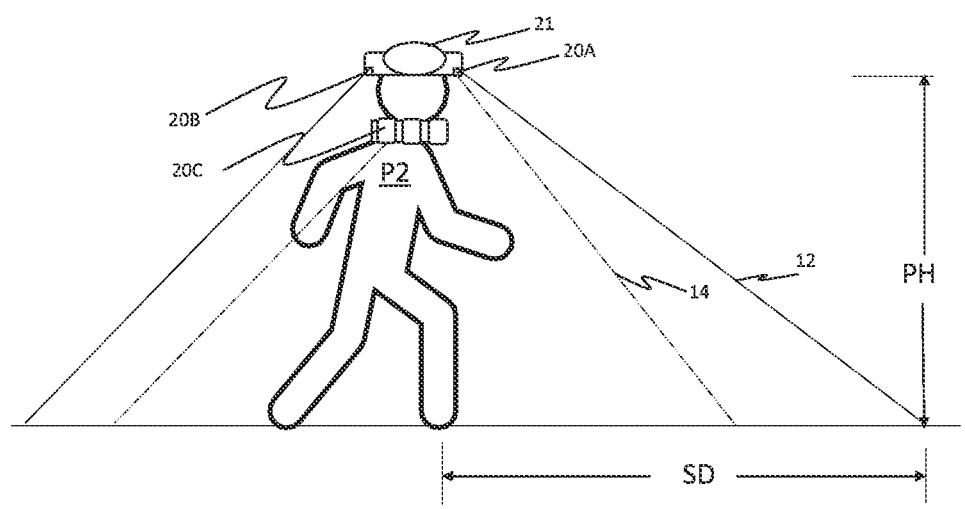
FIG. 3A shows a plan view of a person wearing an SD device according to another implementation of the present principles.
Figure 3B:
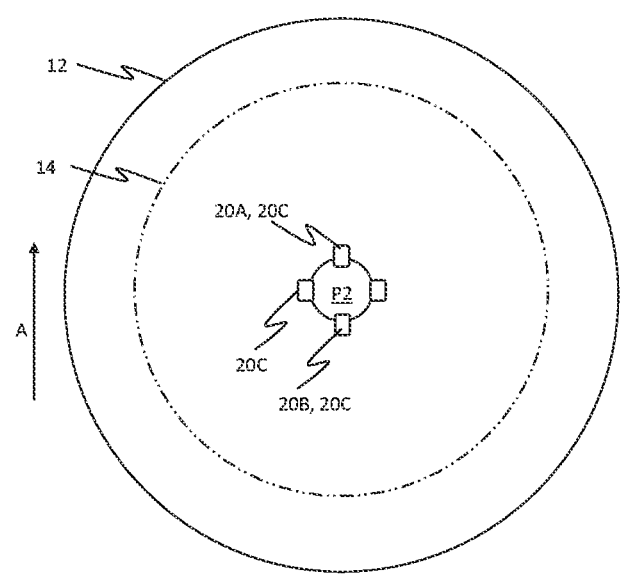
FIG. 3B shows an overhead view of person A in FIG. 3A with various perimeter settings of the SD Device, according to yet another implementation of the present principles.

FIGS. 3A and 3B show another implementation of an SD device 20 according to an implementation. Here, one or more devices 20A, 20B, can be positioned on person P2's hat 21, thus increasing the PH. In this implementation, one device 20A can operate just as described above with respect to the implementation of FIG. 2. However, it will be appreciated that the ability to project a full circle of light around P2 is facilitated using two SD devices, 20A, 20B. In another embodiment, a belt or ring of light sources 20C, such as LEDs or the like can be implemented around the hat 21 around a neck of the person P2, over the shoulder (a sash), as an arm band, waist band or the like. In a particularly useful embodiment, the light sources 20C can be distributed over a flexible garment and the light sources 20C can be individually adjusted to create a light region 22 or 24.

In one embodiment, one or more light sources 20A, 20B, 20C, etc. may be employed in conjunction with a light guide or guides. The light guides can include optical fibers that are woven into the fabric or disbursed along the band or features of the SD device 20. The light from the optical fibers can be adjusted using a clamping mechanism that can alter or modify an angle of an end portion of the fiber. In this way, a distance from person P2 can be adjusted for a light pattern or indicator that will indicate on the ground a safe distance.

Figure 4A:
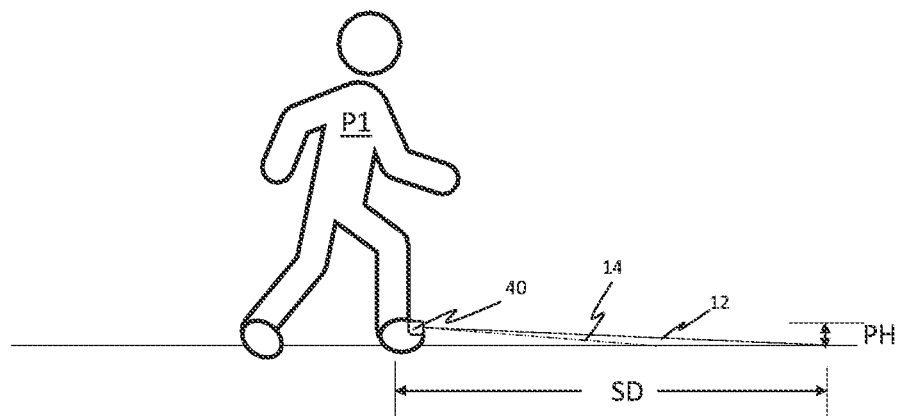
FIG. 4A shows a plan view of a person wearing an SD device according to yet another implementation of the present principles.
Figure 4B:
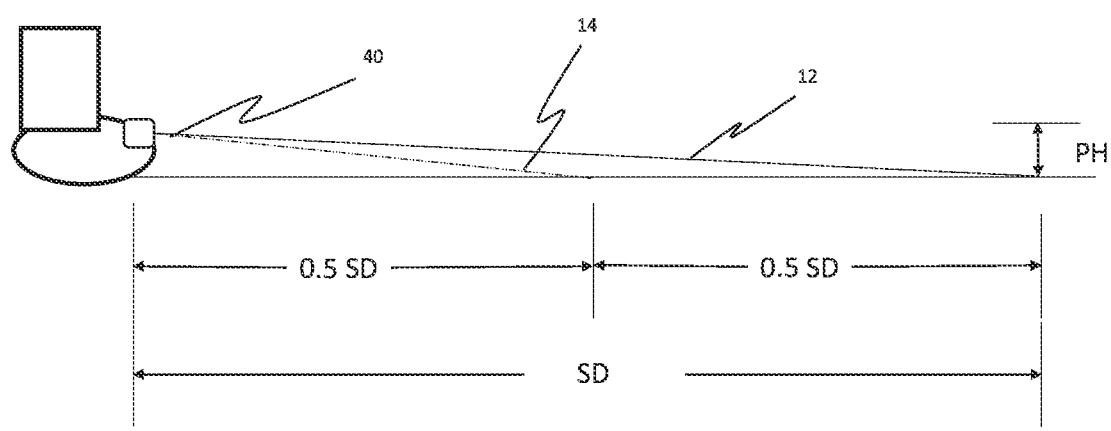
FIG. 4B is an enlarged schematic view of a person's foot wearing the SD device of FIG. 4A.

FIGS. 4A and 4B show another implementation where the SD device 40 is positioned on the person's shoe or ankle to project light 12 or 14, etc. at the appropriate SD or ½ SD, respectively. In this implementation, it is appreciated that the projected light will move as the user's walks, but each time the user's places their foot on the ground, they will have a visual indication of the appropriate distance. This embodiment permits for easy storage of batteries on the shoe or the shoe itself can be modified to store the batteries within the sole or elsewhere. In other implementations, the SD device 40 can be built into (or integrated) into the shoe during manufacturing.

FIG. 5 shows a schematic block diagram of an exemplary embodiment of the SD device shown in the implementations of FIGS. 2 (10), 3 (20) and 4 (40). The SD device 10, 20, 40 can include a simple device, in one embodiment, having lights, an adjustment mechanism and a portable power source. In more complicated embodiments, a processor and memory can be employed with a processor/memory device 50, connected to a power source 52, and a light emitting/projecting device 56. A power switch 54 is also connected to the power source 52. An interface 58 can be provided to allow the SD device to be programmed by an external device (e.g., smartphone, tablet, etc.) and/or to allow for charging of the battery 52. In one implementation, the interface 58 can be a USB type interface. In other implementations, the interface 58 can be entirely wireless using WiFi, Radio Frequency—RF (e.g., Bluetooth® or cellular), near field communication (NFC), etc. Battery charging can also be wired or wireless using known wired charging or induction charging methods/systems. In other embodiments, the SD device 10, 20, 40 can includes a proximity sensor 66 (described in more detail below). In this embodiment, the proximity sensor 66 can operate to change the color of the light emitted from emitter/projector 56 based on sensed proximity of other objects/people.

Figure 6:
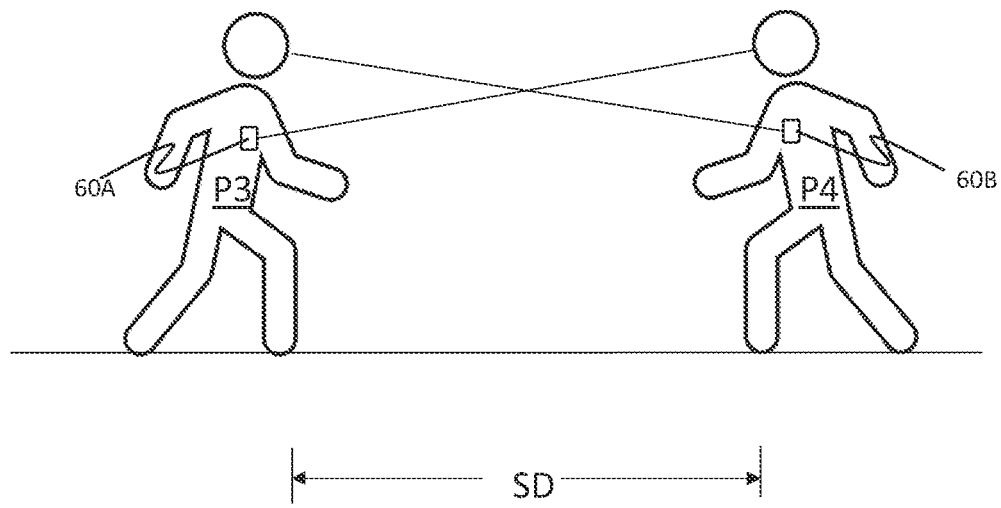
FIG. 6 is plan view of the implementation of a wireless SD device, according to another implementation of the present principles.

FIG. 6 shows a plan view of two people. P3 and P4 wearing completely wireless SD devices 60A and 60B, respectively, according to yet another embodiment of the invention. In this implementation, the SD devices 60A and 60B include proximity sensors 66 (FIG. 5).

In accordance with one implementation where the user is wearing SD device 60, the proximity sensor circuitry 66 is configured to sense the presence of another person or object that comes within the programmed social distance (SD). When there is no one within the user's SD perimeter, by way of example, the green indicator 70 can be (and remain) illuminated. This provides a visual indication to others that they have not breached that person's SD perimeter.

When someone comes too close and breaches the user's SD perimeter, the indicator 74 can illuminate in red allowing that person to visually see that they have breached the user's SD perimeter. In addition to the red indicator 74, audible indication can also be emitted from speaker 74.

Referring again to FIG. 5, proximity sensors 66 can employ any of a plurality of technologies to measure a distance to another person or to another proximity device (e.g., sensor 66). One illustrative technology can include sending and receiving an infrared beam that reflects off of a person to measure the distance therebetween. Another technology can include a capacitive measurement. This measurement measures proximity in accordance with the distance between a person. The distance of the person has an impact on a measured capacitance. The capacitance is monitored and update the SD device 10, 20, 40, 60 accordingly. Other technologies can be employed as well.

Figure 7:
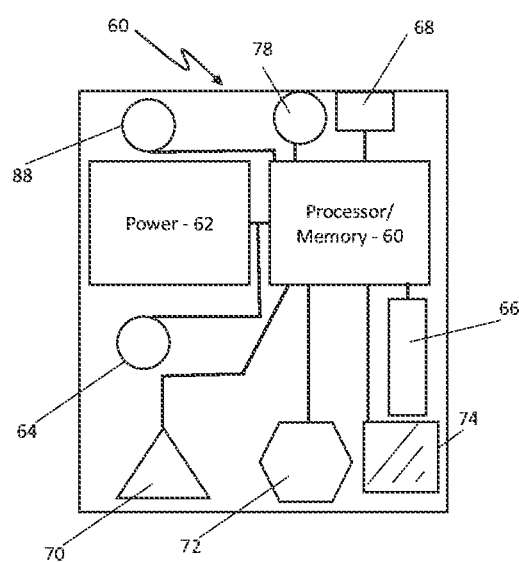
FIG. 7 is a schematic block diagram of the wireless SD device, according to yet another implementation of the present principles.

FIG. 7 shows a schematic block diagram of the SD device 60 having proximity capability. As shown, the SD device 60 includes a processor/memory 60 connected to a power source 62, and proximity sensor circuitry 66. Examples of proximity sensors can be those that use infrared, ultrasonic, inductive (capacitive), RFID and/or near field communication (NFC) technologies. In other embodiments, the proximity sensor 66 could be a consistent measurement of distance using the laser light that may already be built into the SD device. In this embodiment, the use of laser lights for measuring distance uses optics and phase shift calculations to compare reflection of the emitted light or using a time of flight calculation.

Further referring to FIG. 7, a power switch 64 is connected to the power source. Visual indicators 70 and 72 are also provided, as well as a speaker 74 for providing audible indications. Examples for visual indicators would be, for example, indicator 70 can be a "green" light, and indicator 72 can be a "red" light, where red would indicate that the user's social distance has been breached, and green indicates that the user's social distance is clear. In other embodiments, various colors can be used to indicate other states of proximity sensing or state of the device. In this embodiment, only two visual indicators are provided. According to other embodiments, there can be a plurality of visual indicators that operate like a distance meter where illumination of one (1) indicator represents a low threat to the user's social distance boundary, and illumination of two, three, or more indicators represents increasing violation/breach of the user's social distance boundary.

In other embodiments, the SD device 60, 260 can also include a camera 78, 278 which can be used to further assist in identifying trusted or non-trusted individuals. Camera 78, 278 would have high enough resolution to allow a facial recognition software to be used and run by processor/memory 60.

SD devices described herein are particularly useful for indoor use; however, these devices can be adapted for outdoor use as well by changing the light output intensity, color or manner in which the light is generated. For example, a bright blue or red light may be more visible outdoors and a flashing or intermittent pulse may make the light more visible in an outdoor environment. In some embodiments, a light sensor 88 may be employed to adjust the light output to conserve battery power or to account for environmental conditions. The light sensor 88 can include a photovoltaic device or the like to measure the ambient light and can provide feedback to the processor 60 to increase power to the light or change the mode in which light is delivered, e.g., change color, change pulse rate, etc.

In other contemplated implementations, the SD device 60 can be configured to only sense other similar SD devices (e.g., programmed with a particular configuration, etc.). In this implementation a plurality of SD devices 60 can be distributed to a group of people at a particular event (e.g., business gathering, seminar or trade show), and in this manner, the attendees can be assured that safe distancing is maintained as they participate in the event.

In accordance with other implementations, a scenario is envisioned where two or more people who live together or are partners, or just close friends who have cleared their concerns between them about social distancing, yet they still want to go out as a group to do something in public where they will likely encounter others who are not part of the group. In this scenario, the SD device 60 would be programmable to include device specific addresses of other SD devices in the group, and thereby allow the group to "except" members of their group on sensing of the breach of social distance between them. In this way when the group goes out, their SD devices will indicate Green for all those "excepted" or approved to be in their group and will indicate red (or other color) for purposes of informing newly encountered individuals as to their appropriate social distance.

Here, the set distance between individuals can be adjusted in accordance with a level of trust. The level of trust can be programmed using an interface, e.g., device 280 (FIG. 12). In one embodiment, the user can use an App 288 (FIG. 13) to assign a level of trust to member of a user's contact list 292 or to a predetermined or pre-identified list of individuals at a meeting. In this way, an indication as to whether an individual can approach closer or not is provided. When programming levels of trust using an interface, the user may be able to designate one or more specific individuals by using their smartphone number (whether already programmed in their phone as contact or not). The identification by smartphone telephone number can allow the user's device to identify the trusted user through any known technology in their respective devices, for example, NFC, Bluetooth®, or other proximity communication between the user's and the trusted individual's device.

In other embodiments, the SD device 260 can include its own unique identifier (e.g., MAC address, SIM Card ICCID, IP address, or the like) that can be used to identify other SD devices and program trust levels using the smartphone interface.

In yet further embodiments, the SD device 260 includes a camera 278 which can be used in identifying individuals that are trusted by implementing facial recognition software being run by the processor/memory 60. In this manner, when programming the SD device 260 with a smartphone the user could use photographs of trusted individuals as one way of identifying such individual.

Other Examples of how to indicate the level of trust can include changing of colors of the light emitted based on proximity of the individual where different colors indicate different outer light boundaries (e.g., green, yellow, red). Another manner to indicate trust could include audible sounds, such as beeps or buzzers, or ring tone type audio files that are emitted depending on the trust level of the individual approaching the user of the SD device 260.

Figure 8:
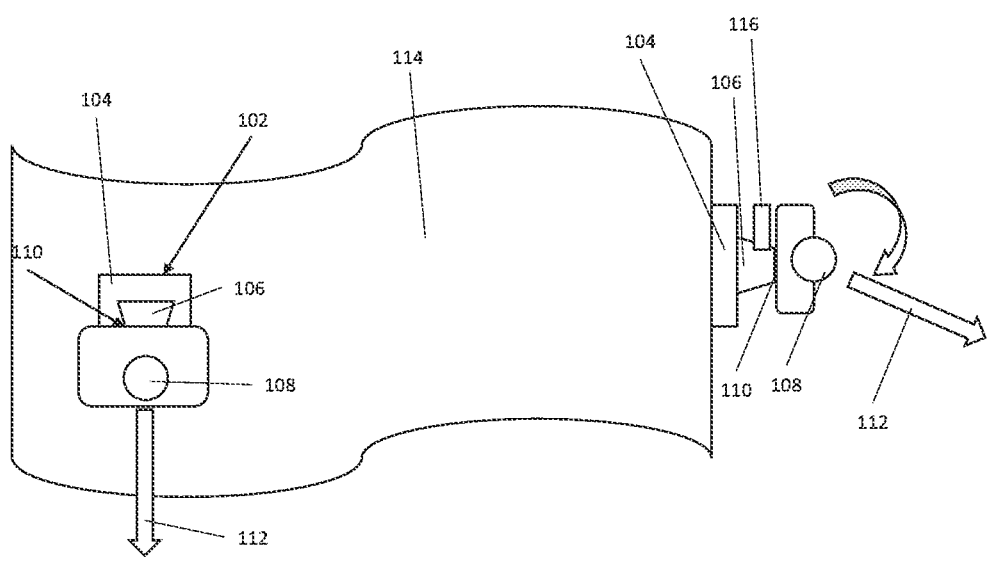
FIG. 8 is a schematic view of a light adjustment mechanism of an SD device according to another implementation of the present principles.

Referring to FIG. 8, a light adjustment mechanism 102 is illustrated, which can be employed with any or all the embodiments shown and/or described. The light adjustment mechanism 102 can include a base or an attachment position 104 that connects or attaches to an physical object 114, such as an article of clothing, hat, shoe, skin, a face mask, a face shield or can be draped or otherwise hung over a portion of a person. The attachment position 104 is preferably a stable position that permits the direction of light or maintains a position of a proximity sensor to permit an indication of a safe distance. The attachment position 104 can include a stanchion 106 having a pivoting position 110 to permit a light source 108 to pivot thereon to provide for angular adjustment of a light beam 112. In one embodiment, the pivoting position 110 can have one or more degrees of freedom.

The wearable base or attachment position 104 can include an adhesive backing, a rivet, a pin, a hook and loop arrangement or any other suitable material or device to permit a stable connection of the base 104 to a person or a person's clothing or effects. In one embodiment, a garment or other substrate can be created or configured to receive the base 104. The garment may include clothing, or a band that can be affixed to a person such as a belt, sash, hat, bandana, etc.

In one embodiment, the adjustment of the light beam 112 can be done manually using a release screw or other friction mechanism to unlock a position of the light source 108. A distance can be indicated on the ground and the light source 108 can be angularly adjusted to achieve the desired distance (e.g., SD or ½SD, etc.). In other embodiments, the angle can be modified using an electronic actuator or other automatic motion device to change the angle of the light source 108.

It should be understood that while one light source is illustratively shown, multiple light sources can be employed from a single attachment portion 104 or using multiple attachment positions 104. The stanchion 106 can include multiple stanchions or the stanchions can be replaced with bars, bands or other structures to permit an array of light sources 108 to be employed about a person to indicate a distance.

Once set, a locking mechanism 116 can be set to hold the position of the light source 108 to maintain the light beam 112 at the desired distance (e.g. SD). The locking mechanism 116 is configured to maintain the light source in a position to direct light a set distance from the person when worn. The locking mechanism 116 can include a friction fit, include a releasable spring-loaded pin, a thumb screw, a gear, a scalloped surface or any other suitable adjustment mechanism and locking device.

Figure 9:
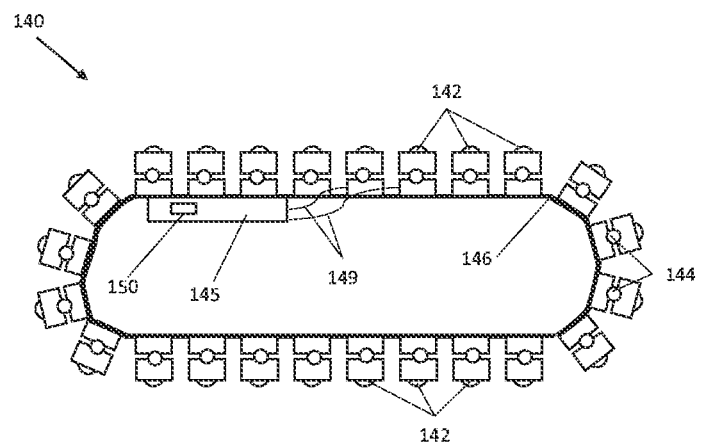
FIG. 9 is a plan view of another wearable SD device according to a further implementation of the present principles.

Referring to FIG. 9, a wearable chain or linkage 140 of light sources 142 can be employed in accordance with another embodiments. The chain 140 can include a plurality of light sources 142 each having a pivot position 144 about which the light source can pivot. The light source 142 can include and LED or other light bulb or can include a lens and an optical fiber. The light sources 142 can each be powered by a battery or other portable energy source 145. In one embodiment, the light sources 142 share light generated by a single laser or LED and deliver light to each light source through optical fibers. The optical fibers can be routed in or through a fabric of a base 146. The base 146 can be flexible to make it adjustable and wearable. The base 146 can generate a force to provide a stable platform from which light can be directed to set forth an SD boundary.

The base 146 can include fabric, elastic, or any other flexible materials. The base 146 can include a buckle, snap, hook and loop connection or any other adjustment device or media to assist in coupling linkage 140 to a person for usage. The base 146 can be applied to a head, neck, should arm, waist, leg, foot or any other part of a person to enable a beam or beams of light to be directed toward the ground and a set distance (e.g., SD) from the user.

The pivot position 144 permits the light from the light source to be directed a desired distance. The pivot position 144 can employ a frictional feature such that upon moving the light source relative to the base 146 the position is maintained by a frictional force provide by the tightness between the mating parts. In other embodiments, screws, locking mechanisms or other mechanical features may be employed to set the positions of the light sources 142.

While the linkage 140 or any of the SD devices described herein are particularly useful for indoor use, these devices can be adapted for outdoor use as well by changing the light output intensity, color or manner in which the light is generated. For example, a bright blue or red light may be more visible outdoors and a flashing or intermittent pulse may make the light more visible in an outdoor environment. In other embodiments, a light sensor 150 may be employed to adjust the light output to conserve battery power or to account for environmental conditions.

In one embodiment, one or more light sources 142 may be employed in conjunction with a light guide or guides 149. The light guides 149 can include optical fibers that are woven into the fabric or disbursed along the band 146 to connect to light sources to provide light from a single source. The light from the optical fibers 149 can be adjusted using a clamping mechanism or pivot 144 that can alter or modify and angle of an end portion of the fiber. In this way, a distance from a person can be adjusted for a light pattern or indicator that will indicate on the ground a safe distance. Alternately, the fibers 149 depicts could include electrical power lines that power each light source 142 using a portable power supply in base 145.

Figure 10:
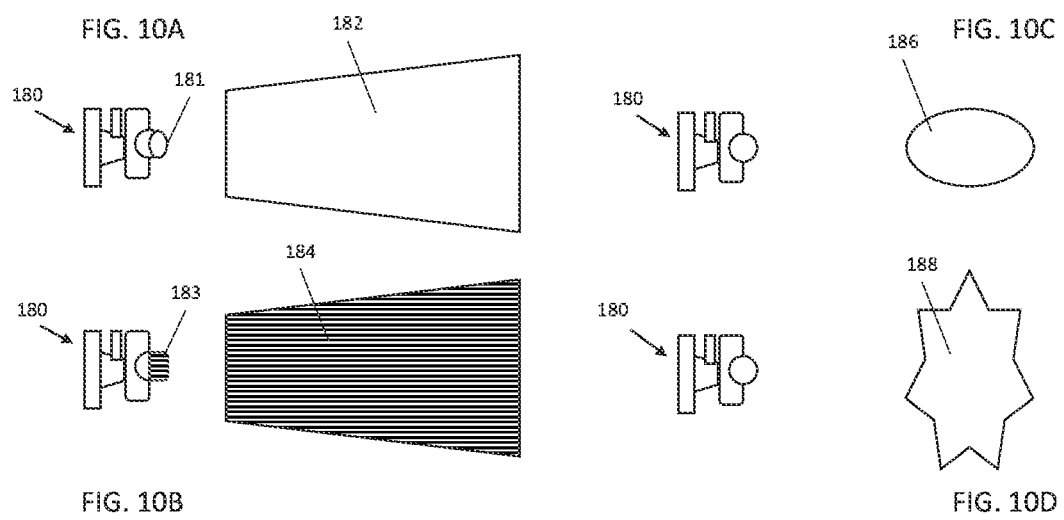
FIGS. 10A-10D show various examples of light emitting patterns that can be implemented with the SD devices of the present principles.

Referring to FIGS. 10A-10D, SD devices 180, which can include any or the devices described herein can include features to change or create different light characteristics. In addition to color, intensity and pulse width, the light projected to a safe distance boundary or social distance boundary (SD) can be modified into different patterns or images. In FIG. 10, a light pattern 182 includes a trapezoidal shape having its end boundary at a set distance from a user. This distance can be set manually by adjusting the angle of the light source relative to a measure position (e.g. SD). The shape of the projected light can be controlled by a lens, shutter or an iris 181. In FIG. 10B, a light pattern 184 includes a shape having high and low intensity light with its end boundary at a set distance from a user. This pattern can be set by adjusting a grating or cover 183 over the light source. In FIG. 10C, a light pattern 186 includes a spot shape having its end boundary at a set distance from a user. This distance can be set manually by adjusting the angle of the light source relative to a measure position (e.g. SD). In FIG. 10D, a light pattern 188 includes a fanciful shape or image having its end boundary at a set distance from a user. This distance can be set manually by adjusting the angle of the light source relative to a measure position (e.g. SD). The shape or image can be set or stored in memory. The shape can include high and low light intensity spots and can include shapes of cartoon characters, text or any other type of shape or image. In useful embodiments, these patterns and other patterns can be used together or in any combination from single light source or multiple light sources.

Figure 11:
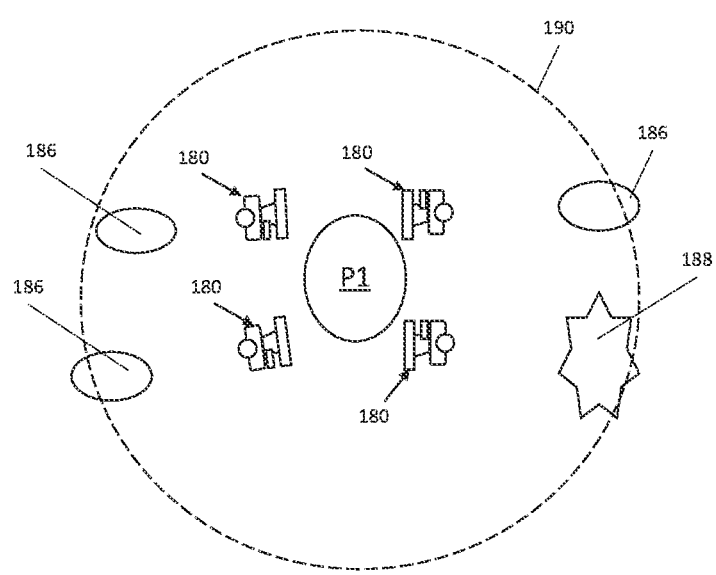
FIG. 11 is a schematic diagram of various examples of how the light emitting patterns can be used to define the SD boundary, according to another implementation of the present principles.

Referring to FIG. 11, multiple light sources 180 can be employed on different positions about a person P1 to generate spots 186, 188 or other patterns that when combined delineate a boundary 190. The boundary 190 can be provided at a safe distance, SD, ½SD, etc.

The boundary 190 can include a continuous pattern such as an arc or multiple overlapping arcs or two or more spots, shapes or images. In some embodiments, the type, intensity, color, texture, etc. can be user selectable using switches on the SD device itself. In one embodiment, an application on a smart phone can be employed to program the characteristics of the light illumination characteristics.

Referring to FIG. 12, an application or app 288 can be provided on an electronic device 280, such as a desktop computer, a laptop, tablet, smart phone or the like. The app 288 can include functions to adjust the characteristics of the light beam provided by an SD device 260. The app 288 can be employed to control light characteristics in accordance with a control application interface rendered on a display of the electronic device 280. The app 288 can include switches or slides to permit adjustment of a number of characteristics, e.g., example, intensity 286, color 284, pattern 282, image selection 290, etc. A user can select the characteristics and make modifications by moving a virtual slide, flipping a virtual switch, turning a virtual knob, or selecting an option (e.g., an image). It should be understood that in other embodiments, these selections may be configured in hardware on the SD device 260 itself using mechanical switches, knobs, etc. The device 280 can communicate with the SD device 260 using an antenna 262 and using wireless protocols such as Bluetooth™ or the like. In other implementations the SD device can be connected to the electronic device via a wire (e.g., USB) for programming and disconnected before using the same. Device 260 can include a plurality of LEDs 268, 270, 272. The LEDs 268, 270, 272 can include red, green, blue, white or all of these and other colors. The LEDs 268, 270, 272 can have their intensity controlled. The red, green, blue (RGB) colors can be adjusted to output a desired color. A shutter, lens or light beam shaper 266 can be employed to change the texture or pattern shape. An imaging chip 274 or other imaging generating device can be employed to generate an image or display a stored image (stored in memory 60).

A sensor 264 can be employed to measure ambient light conditions and adjust one or more of the characteristics in accordance with the light conditions. The App 288 can include a switch or control to disable or enable this or other features as desired by the user. The sensor 264 can be employed to sense a distance between strangers and individuals having a level of trust assigned to them (contact list 292). This can be implemented by sensing individuals using, e.g., an RFID tag, their telephone, a dedicated identification device, a corresponding SD device, etc. Examples of sensors 264 can be those that use infrared, ultrasonic, RFID, NFC or other technologies. In other embodiments, the sensor could be a consistent measurement of distance using a laser light that may already be built into the SD device. In this embodiment, the use of laser lights for measuring distance uses optics and phase shift calculations to compare reflection of the emitted light or could use a time of flight calculation. Indicators can be lit in accordance with the individual and the level of trust. The set distance of the safe boundary can be changed in accordance with the level or trust. This can include a change of the image, shape of the light beam, color or any other useful indicators. In one embodiment, lights 265, 267 can flash, light, or combinations of these and other indicators.

It should be understood that the features described in the number of embodiments can be combined in any combination to provide an SD device in accordance with the present invention. The combination of features can be implemented together or separately in any arrangement depending on the application, user preference or other criteria. While there have been shown, described and pointed out fundamental novel features of the present principles, it will be understood that various omissions, substitutions and changes in the form and details of the methods described and devices illustrated, and in their operation, may be made by those skilled in the art without departing from the spirit of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles may be incorporated in any other disclosed, described or suggested form or implementation as a general matter of design choice. It is the intention, therefore, to be limited only as indicated by the scope of the claims appended hereto.

It is to be understood that aspects of the present invention will be described in terms of a given illustrative architecture; however, other architectures, structures, materials and process features and steps can be varied within the scope of aspects of the present invention. Methods of use of the devices described herein are contemplated.

It will also be understood that when an element is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated, features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the FIGS. It will be understood that the spatially relative terms are intended to encompass different orientations of the device in use or operation in addition to the orientation depicted in the FIGS. For example, if the device in the FIGS. is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A social distance device, comprising:
a wearable base configured to be positioned on a person;
a light source pivotally connected to the base to permit angular adjustment of the light source relative to the base, the light source directly projecting light onto the ground at least in front of the person; and
a locking mechanism integrated with the pivotal connection of the light source to the base and configured to adjust and maintain the light source in a position by a light adjustment mechanism using an automatic motion device to direct the projected light a set distance from the person when worn to indicate a safe distance boundary, wherein the set distance is adjusted in accordance with a level of trust of at least one individual in a vicinity of the person, wherein the level of trust is determined in accordance with an assigned level of trust in accordance with information stored in computer readable memory.

2. The social distance device as recited in claim 1, wherein the set distance is adjusted in accordance with a level of trust which is determined by sensing individuals in proximity to a wearer using a smartphone.

3. The social distance device as recited in claim 1, wherein the set distance is adjusted in accordance with a level of trust which is determined by sensing individuals in proximity to a wearer using a radio frequency identification (RFID) tag.

4. The social distance device as recited in claim 1, wherein the set distance is adjusted in accordance with a level of trust which is determined by sensing individuals in proximity to a wearer using a dedicated identification device.

5. The social distance device as recited in claim 1, wherein the set distance is adjusted in accordance with a level of trust which is determined by sensing individuals in proximity to a wearer using a corresponding social distance (SD) device.

6. The social distance device as recited in claim 1, wherein the set distance is adjusted in accordance with a level of trust which is determined by sensing individuals in proximity to a wearer using an RFID device and a near field communication (NFC) device.

7. The social distance device as recited in claim 1, wherein the level of trust is determined in accordance with an identity of another person in proximity of the social distance device.

8. The social distance device as recited in claim 1, further comprising an indicator configured to indicate the level of trust.

9. The social distance device as recited in claim 1, further comprising a sensor configured to sense a person within the set distance, the indicator indicating a level of trust that is configured to change in response to the sensed person.

10. The social distance device as recited in claim 1, wherein the locking mechanism includes a frictional pivot.

11. The social distance device as recited in claim 1, wherein the wearable base includes an adjustable material to enable affixing the social distance device around different body parts.

12. The social distance device as recited in claim 1, wherein the wearable base is configured to connect to an artifact worn on a person.

13. The social distance device as recited in claim 1, wherein the light source generates a directed beam to illuminate a position on the ground at the set distance.

14. The social distance device as recited in claim 1, wherein the light source generates a light pattern up to the set distance.

15. The social distance device as recited in claim 1, wherein the light source generates a light characteristic in accordance with an ambient condition.

16. The social distance device as recited in claim 1, wherein the light source generates a light characteristic in accordance with a control application interface rendered on a display of an electronic device.

17. The social distance device as recited in claim 1, wherein the light source includes a plurality of light sources that generate a plurality of light beams that combine to form a boundary about the person at the set distance.

18. The social distance device as recited in claim 1, further comprising a proximity sensor connected to the wearable base and configured to sense the presence of an object or person that is a predetermined safe social distance from the wearable base.

19. A social distance device, comprising:
a wearable base configured to be positioned on a person;
a light source pivotally connected to the base to permit angular adjustment of the light source relative to the base, the light source directly projecting light onto the ground in proximity of the person; and
the light source being positioned by a light adjustment mechanism using an automatic motion device to direct the projected light a set distance from the person when worn to indicate a safe distance boundary, wherein the projected light indicates a level of trust of at least one individual in a vicinity of the person, wherein the level of trust is determined in accordance with an assigned level of trust in accordance with information stored in computer readable memory.

20. The social distance device as recited in claim 19, wherein the projected light is adjusted in accordance with a level of trust which is determined by sensing individuals in proximity to a wearer using a smartphone.

21. The social distance device as recited in claim 19, wherein the projected light is adjusted in accordance with a level of trust which is determined by sensing individuals in proximity to a wearer using a radio frequency identification (RFID) tag.

22. The social distance device as recited in claim 19, wherein the projected light is adjusted in accordance with a level of trust which is determined by sensing individuals in proximity to a wearer using a dedicated identification device.

23. The social distance device as recited in claim 19, wherein the projected light is adjusted in accordance with a level of trust which is determined by sensing individuals in proximity to a wearer using a corresponding social distance (SD) device.

24. The social distance device as recited in claim 19, wherein the projected light is adjusted in accordance with a level of trust which is determined by sensing individuals in proximity to a wearer using an RFID device and a near field communication (NFC) device.

25. The social distance device as recited in claim 19, wherein the level of trust is determined in accordance with an identity of another person in proximity of the social distance device.

26. The social distance device as recited in claim 19, further comprising a sensor configured to sense a person within the set distance, and further comprising an indicator indicating a level of trust that is configured to change in response to a sensed person.

27. The social distance device as recited in claim 19, wherein the light source generates a directed beam to illuminate a position on the ground at the set distance.

28. The social distance device as recited in claim 19, wherein the light source generates a light characteristic corresponding to the level of trust of a sensed individual.

29. The social distance device as recited in claim 19, wherein the light source generates a light characteristic in accordance with a control application interface rendered on a display of an electronic device.

30. The social distance device as recited in claim 19, wherein the light source includes a plurality of light sources that generate a plurality of light beams that combine to form a boundary about the person at the set distance.

31. The social distance device as recited in claim 19, further comprising a proximity sensor connected to the wearable base and configured to sense the presence of an object or person that is a predetermined safe social distance from the wearable base.

* * * * *